G. H. FRASER.
SCREENING APPARATUS.
APPLICATION FILED DEC. 18, 1907. RENEWED MAY 4, 1916.

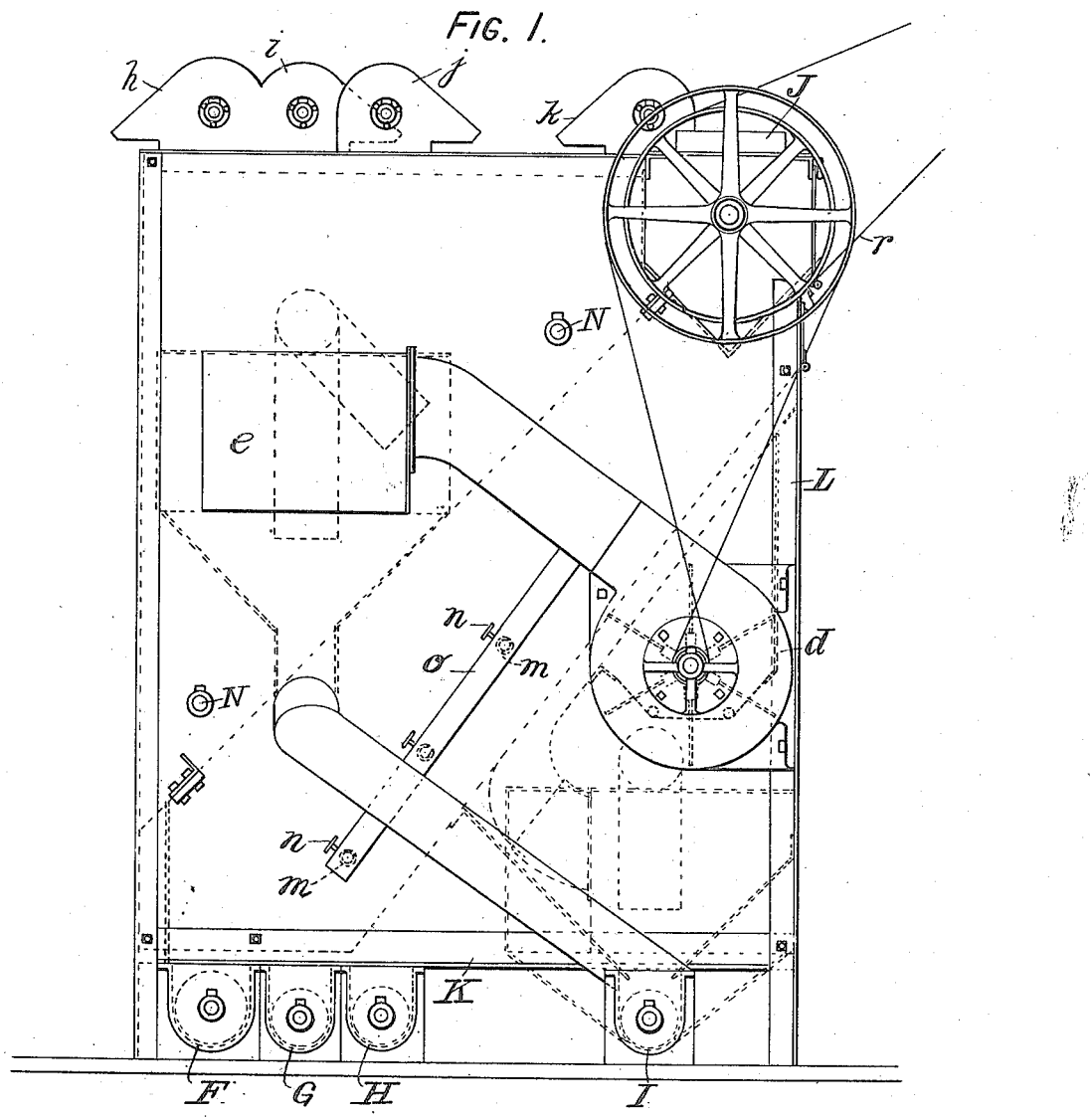

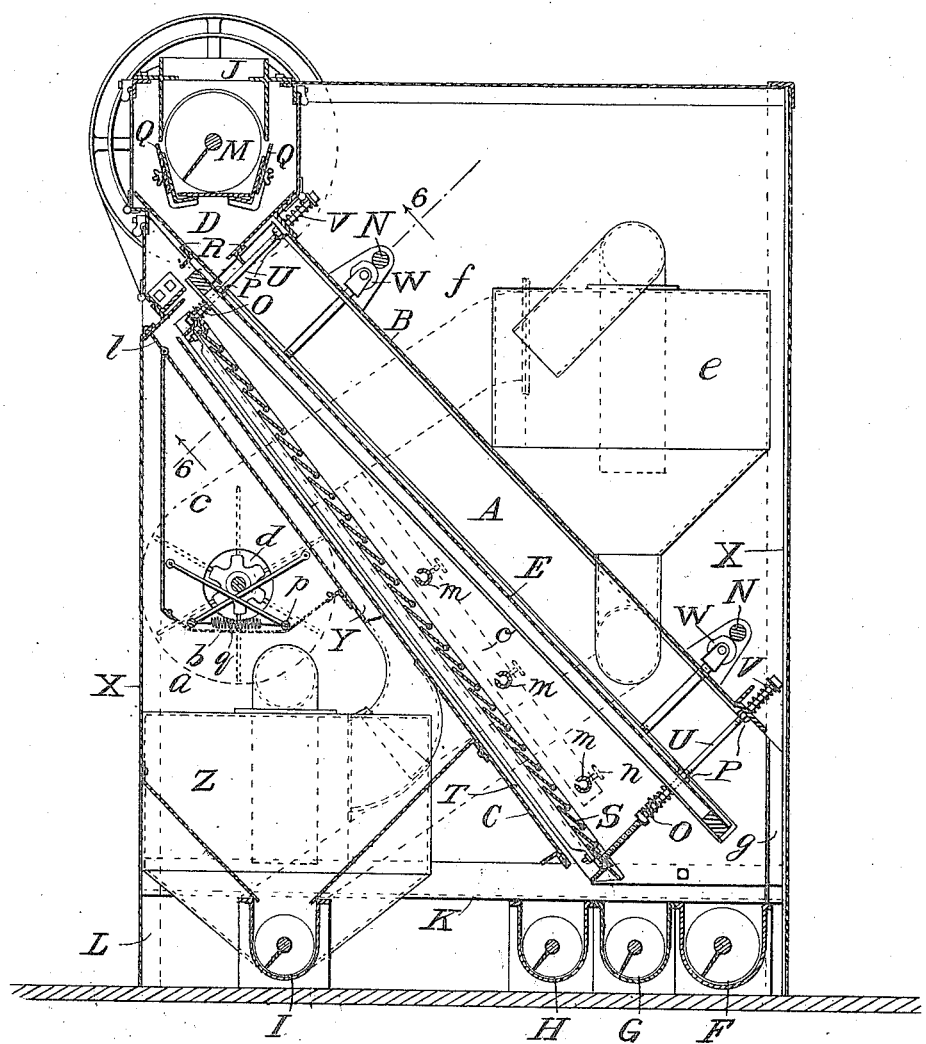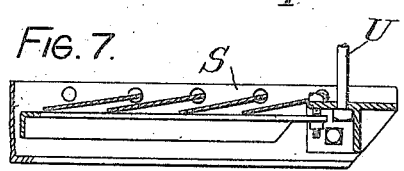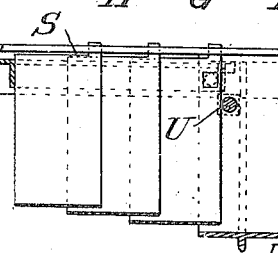

1,202,375.

Patented Oct. 24, 1916.
5 SHEETS—SHEET 3.

WITNESSES:
Fred White
H.J. Wallace

INVENTOR
George Holt Fraser,
By Attorneys,

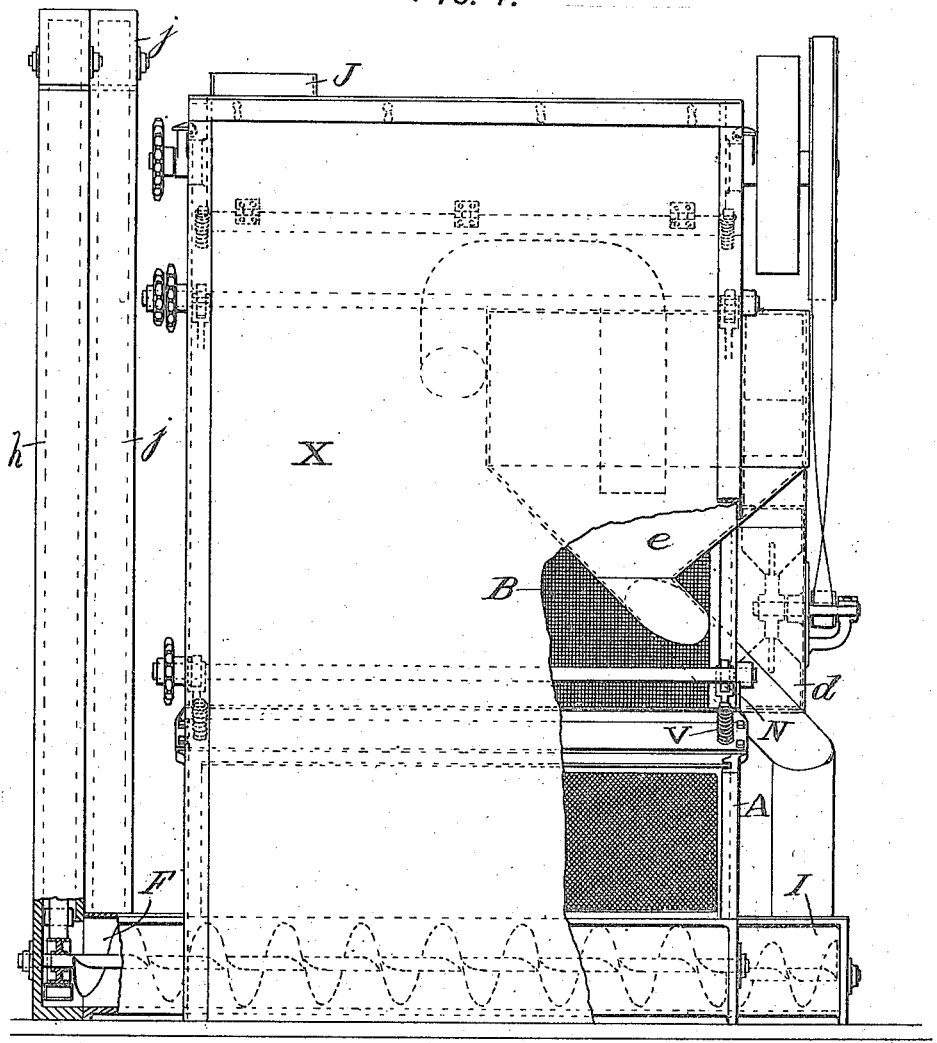

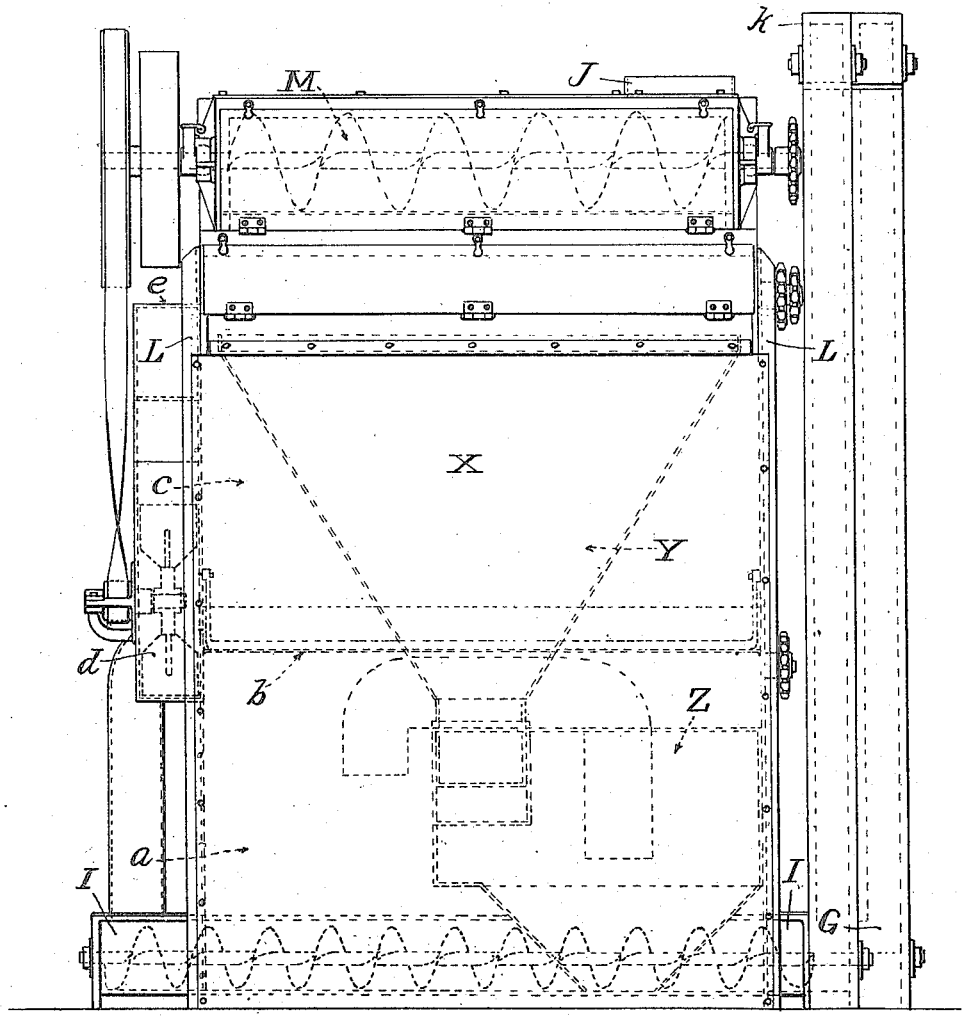

UNITED STATES PATENT OFFICE.

GEORGE HOLT FRASER, OF NEW YORK, N. Y.

SCREENING APPARATUS.

1,202,375.     Specification of Letters Patent.     Patented Oct. 24, 1916.

Application filed December 18, 1907, Serial No. 407,020. Renewed May 4, 1916. Serial No. 95,496.

*To all whom it may concern:*

Be it known that I, GEORGE HOLT FRASER, a citizen of the United States, residing in the borough of Brooklyn, county of Kings, city and State of New York, have invented certain new and useful Improvements in Screening Apparatus, of which the following is a specification.

This invention relates to apparatus for screening, sizing or separating finely divided materials, and aims to provide improvements therein.

Heretofore screening has been effected by distributing material over the upper end of an inclined vibrating screen, through which the fine material escaped and passed to one outlet, while the coarse material flowed over the lower end of the screen to another outlet. For material too fine to screen, air separation has been employed, the material being subjected to centrifugal action in a rapidly moving current of air in a dust collector.

This invention aims to provide an improved separator or sizer, and to this end provides certain improvements in the construction, arrangement and operation of mechanical screening apparatus, and combines with such apparatus fluid current separating devices.

It also provides various other features of improvement, all of which will be hereinafter more fully set forth with reference to the accompanying drawings, in which—

Figure 3:
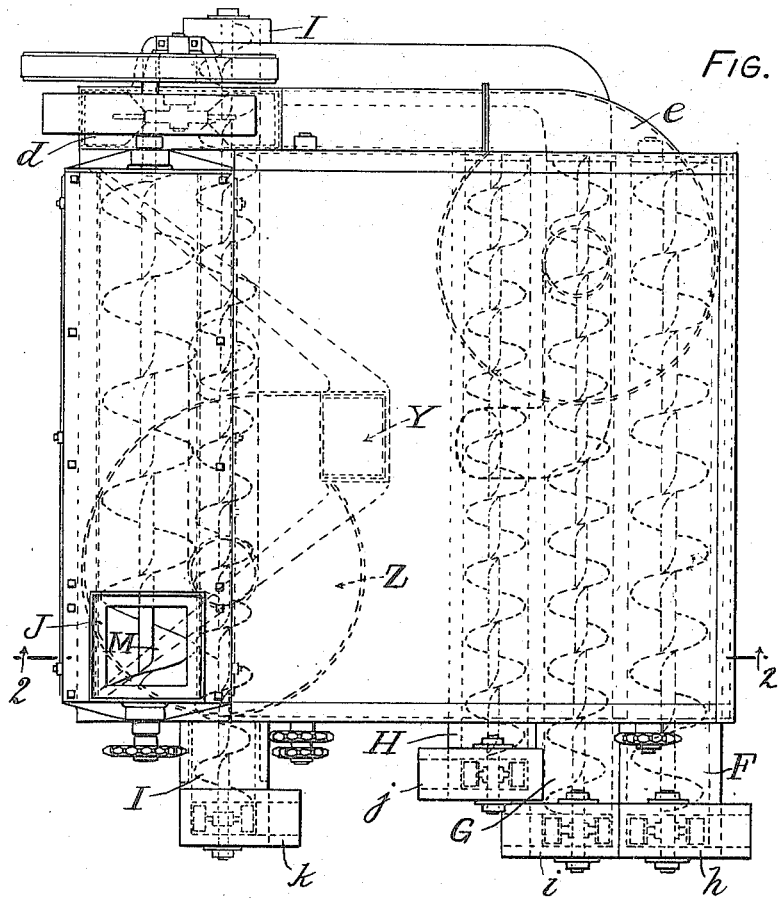
Figure 6:
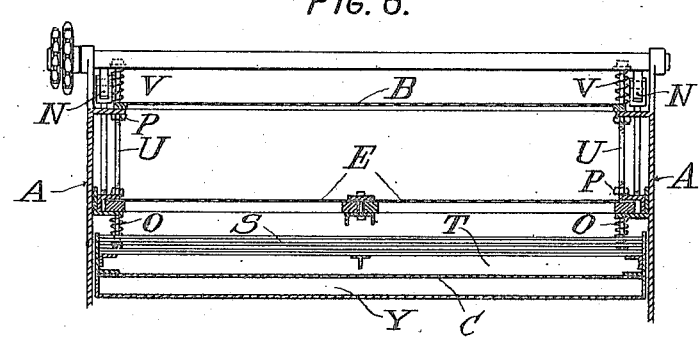

Figure 1 is a side elevation of the preferred form of this invention; Fig. 2 is a transverse section thereof; Fig. 3 is a plan view thereof; Fig. 4 is a front elevation thereof; Fig. 5 is a rear elevation thereof; and Fig. 6 is a longitudinal section cut on the line 6—6 in Fig. 2. Figs. 7 and 8 are enlarged fragmentary detail views of the wall S. Figs. 9 and 10 show modifications.

Referring to the drawings, A A are the side frames of the screen casing, B is the inclined front thereof, C is the inclined back thereof, and D is the distributer at the top thereof.

E are the screen members within the casing, F, G, H and I are discharge outlets, and J is the feed hopper.

According to this invention the sides A are each a single member or casting pivotally mounted at the lower end on feet K, and supported by legs L so as to be adjustable as to angularity, these castings each being formed with bearing sockets for the usual revolving conveyer M and vibrators N. The bottom wall C is of greater steepness than the screen E, and is removably connected to give access beneath the screen. The top B is open or foraminous. The screens E are movable, being separate members carried in a spring-mounted frame adjustably supported by springs O and limited in upward movement by knocking stops P.

The distributer D has adjustable feed boards Q at each side of the conveyer, constituting a trough for the latter, through which trough the material is worked as it is being distributed over the edge of one or the other of the feed boards according to which direction the conveyer M is rotated. Beneath the conveyer are inclined deflectors R which receive the material from the ends of the boards and deliver it onto the screen.

Beneath the screen is a foraminous wall S onto which falls the fine material which passes through the screen. This wall is preferably composed of a great number of steps, plates or slats overlapping one another, and spaced apart sufficiently to form narrow openings between their overlapping edges, so that the surface of the wall is substantially a serrated or stepped surface with backwardly and upwardly opening slots beneath each of the steps. The slats composing the steps are adjustable in inclination both together and independently to vary the width of the openings between them (see Fig. 7). Their steepness is such that material will rapidly flow down from one to the next. The wall formed by the multiplicity of slats is adjustable to vary its steepness independently of the screen and the casing. The wall S is spaced apart from and above the bottom C and is adjustable relatively thereto, thus forming a conduit or passage T beneath the wall S which can be varied to adjust flow back of this wall.

Preferably the wall S is spring mounted and vibrated to agitate its surface and expedite flow of material down it. As shown, it is mounted on rods U supported by adjustable springs V, on which rods the springs O for the screen frame are also adjustably mounted.

Vibration of the screens E and wall S is effected in any way, as by the cam wheels W which are carried by rods adjustably screwed to the screen frame and ride on the shafts or wheels N.

When a single separation of sizes sufficiently large to permit mechanical screening is desired, the material passing through the screens E will flow into one outlet G, and the coarse material passing over the screen will flow into the other outlet F. In such case the bottom wall S will by its vibration facilitate the speedy downflow of the fine material. When, however, it is desired to make one or more additional separations, my invention provides for this by employing a fluid current, air if dry separation, and water if wet separation, is desired. To this end I preferably inclose the screen apparatus as thus far described within a compartment or chamber X, in which the whole is immersed in water if wet separation is desired, or is inclosed in air or other gas if dry separation is necessary, and within this chamber I provide means for circulating the separating medium preferably in reverse direction to the flow of the solid material. As illustrated, a rotary blower or pump is used, and is connected to draw the air downwardly through the screens E and upwardly beneath these screens and through the interstices of the wall S, and then through the conduit T back of this wall, preferably upwardly to a return conduit Y, which communicates with a settling chamber or centrifugal collector Z, which discharges its fines into the outlet I and exhausts into a second settling chamber a, which communicates through a burlap or other sieve b into an exhaust chamber c, which latter communicates with the suction of the pump d, which latter discharges into a second centrifugal collector or settling chamber e above the front of the screen, which collector e discharges its settlings into the outlet I and exhausts its air into the compartment f above the screen, so that the air thus cleared of fines is discharged at the top of the screen through the front B and through the forward inlet g. The effect of this is to create a suction at the back of the screen, clean the air, and return it to the front of the screen, thus forming an endless circuit of inclosed air or other fluid in which the screening and separating operations are conducted, the same fluid being used over and over, and the floating fines being collected at various stages beyond the screen, and at both the suction and discharge sides of the pump.

The current will be adjusted to give the proper speed of flow through the interstices in the wall S, and these will be regulated as to width, length and inclination to best suit them to the work. The current induced through these interstices immediately back of the falling material will be sufficient to catch and lift the floating fines backwardly and upwardly through the cracks, but as the cracks are passed the speed of the current will instantly diminish owing to the greater area of the conduit T, so that the greater portion of the fines carried through the wall S will be deposited on the inclined bottom wall, flowing down the conduit T to the outlet H. Only such material as is fine enough to float upward with the reduced current will pass over the top of the bottom wall C and down through the converging conduit Y to the centrifugal separator Z. The well known centrifugal action of this type of separator will be recognized as sufficient to remove most of the remaining floating material from the fluid current, so that the exhaust from the separator Z will contain very little fine material. The suction to the fan will be in part protected from receiving fine material by the sieve b, which may be burlap or other suitable bolting material, which will keep itself clean by the fact that it is loose and free to flap up and down with variations in the suction. The second centrifugal separator e should entirely clear the current of all fine material, and thus the return flow to the top and front of the screen should be practically clean.

The outlets F, G, H and I will be suitably sealed to prevent undue outflow of the fluid medium, as by mechanism causing the discharged material from each to seal the outlet opening until removed by some automatic means, such as an elevator h, i, j or k, opposite each outlet lifting away only enough of the material to leave the outlet continually closed, and when wet separation is employed the legs of each elevator will be as high at least as the height of the liquid level within the compartment X. The casings of these elevators seal these outlets in the construction shown.

It will be seen that this invention provides for the distribution of the material to be sized in a thin layer over an extensive inclined foraminous surface, in a compartment in which the material is surrounded by a fluid medium circulating at a sufficiently moderate speed not to interfere with the coarser separations incident to gravitation, and not to interfere with the proper gravity flow of the coarser gradings to their respective outlets; and that it provides for successive dropping of the material from stage to stage across a multiplicity of greatly accelerated currents of fluid, then for the settling of certain grades by gravitation, and then for clarifying the fluid by both centrifugal and mechanical action.

It will be understood that these means are broadly applicable, and that the invention is not limited to the particular details of construction, arrangement and operation set forth as constituting its preferred form, since it can be availed of in whole or in part according to such adaptations as circumstances or the judgment of those skilled in the art may dictate, without departing from the spirit of the invention.

The cam wheels W are adjustably carried by the screen frame by rods which may be screwed into the screen frame and pass through the front, and be screwed onto the roller bearings.

Although the front inlet $g$ acts as a jet opening for an inwardly and upwardly flowing current, it may be desirable to supplement this by a number of transverse pipes $m$ directly above the wall S, each having a slot or jet opening for directing a current of air toward the wall. These pipes may be controlled by valves $n$, and fed by a branch main $o$.

If desired the upward current back of the wall S may be discharged directly into the chamber $a$ by turning down the gate $l$, so that the current will flow downwardly back of the chamber $c$ and flow into the chamber $a$.

The sieve $b$ may be cleaned by pivoted cross rods $p$ which are lifted by variations in the suction, and depressed by a spring $q$, or otherwise operated to move or crease the burlap, which will tend to release any material collecting on it.

When the discharge is made directly into the chamber $a$, the duct Y may be omitted, and an inclined wall may subdivide the chamber $a$, and two centrifugal apertures may be placed beneath this chamber with their inlets opening opposite and adjacent to each other, and their outlets connected to the suction of the fan. In this way their inlets will minimize the current between them and create a settling space under the inclined wall.

The apparatus may be driven by a belt $r$ from a remote source of power, and the drive may be reversible to cause the conveyer of the distributer to operate in whichever direction is most convenient. When it is desired the current back of the wall S may descend instead of ascend.

This invention provides an improved process of sizing and separating material consisting in first disposing the unsized mass in a thin film, then subdividing it into superposed layers of different grades, then flowing it by gravity transversely and reversely of a fluid current, and thus washing the coarser grades from the finer grades, and then sizing the finer grades by centrifugal action and by sedimentation and by bolting.

It will be understood that these improvements can be utilized according to any suitable means which may be adapted to these improvements, and that this improved apparatus may be used in whole or in part according to any known methods of treatment, and that neither is limited to the particular details set forth as constituting the preferred form thereof.

One improvement is illustrated in Fig. 9, in which the wall S is arranged as a foraminous cylinder with internal edges, consisting of a number of angle irons fastened to cylindrical heads, the flanges of the angles being turned in to form internal steps which lift the material to be screened, while the fines escape at the cracks between the angles or by an end exit. A fluid current may be drawn through the cylinder, or the current may go through the cracks either inwardly or outwardly to remove the fines as the mass is being revolved in the cylinder.

Fig. 10 shows a form in which the cylinder is made of T-irons the edges being joined, and the projections being inward so as to form under-cut pockets within the cylinder, in which pebbles will lodge, thus making a wear face for the material being revolved therein. In this case the current will pass axially through the cylinder.

While I have herein shown and described the feeder and distributer set forth, the same is not claimed in this application, being the subject matter of claims in my application Serial No. 82,750 of 1915 filed March 7, 1916 and in my application Serial No. 33,464 of 1915 filed June 11, 1915, and in my application Serial No. 33,465 of 1915 filed June 11, 1915.

I claim as my invention:—

1. In combination, a removable adjustable vibrating screen inclined at an angle of approximately 45 degrees, an inclined floor or bottom below said screen and spaced apart therefrom, means for adjusting said screen to vary its inclination relatively to said floor or bottom, and downwardly acting vibrating means for vibrating said screen downwardly.

2. In combination, one or more removable vibrating screens inclined at an angle of approximately 45 degrees and adjustable to vary such inclination, a casing adjustably inclosing said screen or screens, said casing comprising an inclined floor or bottom beneath said screen or screens, adjusting means for adjusting the lower part of said screen or screens relatively to said floor or bottom to vary the inclination of said screen or screens, adjustable downwardly acting jarring means for vibrating said screen or screens, and means yieldingly supporting said screen or screens in said casing.

3. In combination, a plurality of inclined vibrating screens disposed one above another, means for vibrating said screens, and means adjustably connecting them together for controlling their relative inclination.

4. In combination, an inclined removable vibrating screen, a casing for said screen, means supporting said screen from said casing, adjustable bars or posts engaging said screen, vibrating mechanism acting on said bars or posts for vibrating said screen, and a revolving part operating said mechanism.

5. In combination, a removably mounted vibrating screen inclined at an angle of approximately 45 degrees, a casing removably inclosing said screen and comprising an inclined floor or bottom beneath said screen and an inclined top portion above said screen, springs yieldingly supporting said screen and acting to press it upwardly in said casing, movable stop members or rods above said screen acting downwardly against the latter and upwardly toward said inclined top portion of said casing for positioning said screen and resisting said upward pressure by said springs, and downwardly acting jarring means above and for vibrating said screen.

6. In combination, a removably mounted screen inclined at an angle of approximately 45 degrees, a casing removably inclosing said screen and comprising an inclined floor or bottom beneath said screen and an inclined top portion thereover, springs for pressing said screen upwardly in said casing, means limiting upward movement of said screen and resisting the action of said springs, movable bars or posts above said screen, downwardly acting jarring mechanism above said top portion and acting on said bars or posts for vibrating said screen, and a revolving part operating said mechanism.

In witness whereof, I have hereunto signed my name in the presence of two subscribing witnesses.

GEORGE HOLT FRASER.

Witnesses:
FRED WHITE,
THOMAS F. WALLACE.

Copies of this patent may be obtained for five cents each, by addressing the "Commissioner of Patents, Washington, D. C."